United States Patent
Canel Lopez et al.

(10) Patent No.: US 11,301,483 B2
(45) Date of Patent: Apr. 12, 2022

(54) DATA OBJECT AGGREGATION TO MANAGE AN ORDER SUMMARY

(71) Applicant: salesforce.com, inc., San Francisco, CA (US)

(72) Inventors: Osvaldo Rene Canel Lopez, Weston, FL (US); Michael Starukhin, Parkland, FL (US); Susan Levine, Walnut Creek, CA (US); Michael Dandy, San Francisco, CA (US); Steven deRochemont, Lighthouse Point, FL (US); Amanda Hatker, Boca Raton, FL (US)

(73) Assignee: salesforce.com, inc., San Francisco, CA (US)

( * ) Notice: Subject to any disclaimer, the term of this patent is extended or adjusted under 35 U.S.C. 154(b) by 293 days.

(21) Appl. No.: 16/599,060

(22) Filed: Oct. 10, 2019

(65) Prior Publication Data
US 2021/0109941 A1    Apr. 15, 2021

(51) Int. Cl.
*G06F 16/25*       (2019.01)
*G06Q 30/00*      (2012.01)
*G06F 16/2455*   (2019.01)
*G06F 9/451*       (2018.01)

(52) U.S. Cl.
CPC ............ *G06F 16/25* (2019.01); *G06F 9/451* (2018.02); *G06F 16/2455* (2019.01); *G06Q 30/01* (2013.01)

(58) Field of Classification Search
CPC ...... G06F 16/25; G06F 16/2455; G06F 9/451; G06Q 30/01
See application file for complete search history.

(56) References Cited

U.S. PATENT DOCUMENTS

| | | | |
|---|---|---|---|
| 9,015,730 B1* | 4/2015 | Allen | G06F 9/541 719/313 |
| 2002/0010706 A1* | 1/2002 | Brickell | G06F 16/24539 |

OTHER PUBLICATIONS

Safe and secure object-oriented programming with Ada 2012's contracts, pp. 1-13 (Year: 2014).*

* cited by examiner

*Primary Examiner* — Albert M Phillips, III
(74) *Attorney, Agent, or Firm* — Holland & Hart LLP

(57) ABSTRACT

Methods, systems, and devices supporting data storage are described. A database system may store order information for an organization. This order information may span multiple steps of an order lifecycle, including order creation, order changes, order fulfillment, etc. To efficiently store order information for low-latency querying and data consistency, the database system may implement order summaries. For example, a database server may receive a new order data object associated with an order identifier and may create a corresponding order summary data object. If the database system receives any additional data objects associated with the same order identifier, the database server may update the order summary data object based on the additional data objects. If the database system receives a query for information related to the order, the system may retrieve queried values directly from the order summary data object, rather than aggregating data on-the-fly across multiple underlying data objects.

20 Claims, 11 Drawing Sheets

DATA OBJECT AGGREGATION TO MANAGE AN ORDER SUMMARY

FIELD OF TECHNOLOGY

The present disclosure relates generally to database systems and data processing, and more specifically to data object aggregation to manage an order summary.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms supporting CRM solutions may store order information for tenants of a database system. Maintaining order information may pose multiple challenges, such as presenting order information to a user in a digestible fashion, accurately and efficiently generating values related to the order, and efficiently storing order-related information. In some systems, maintaining order information may involve querying multiple data domains (e.g., multiple databases, multiple application programming interfaces (APIs), multiple applications, multiple clients, etc.) to retrieve and/or update order related information. Querying multiple data domains may increase system latency and degrade user experience. In some cases, maintaining order information without querying multiple data domains may create data inconsistencies.

DETAILED DESCRIPTION

Figure 1:
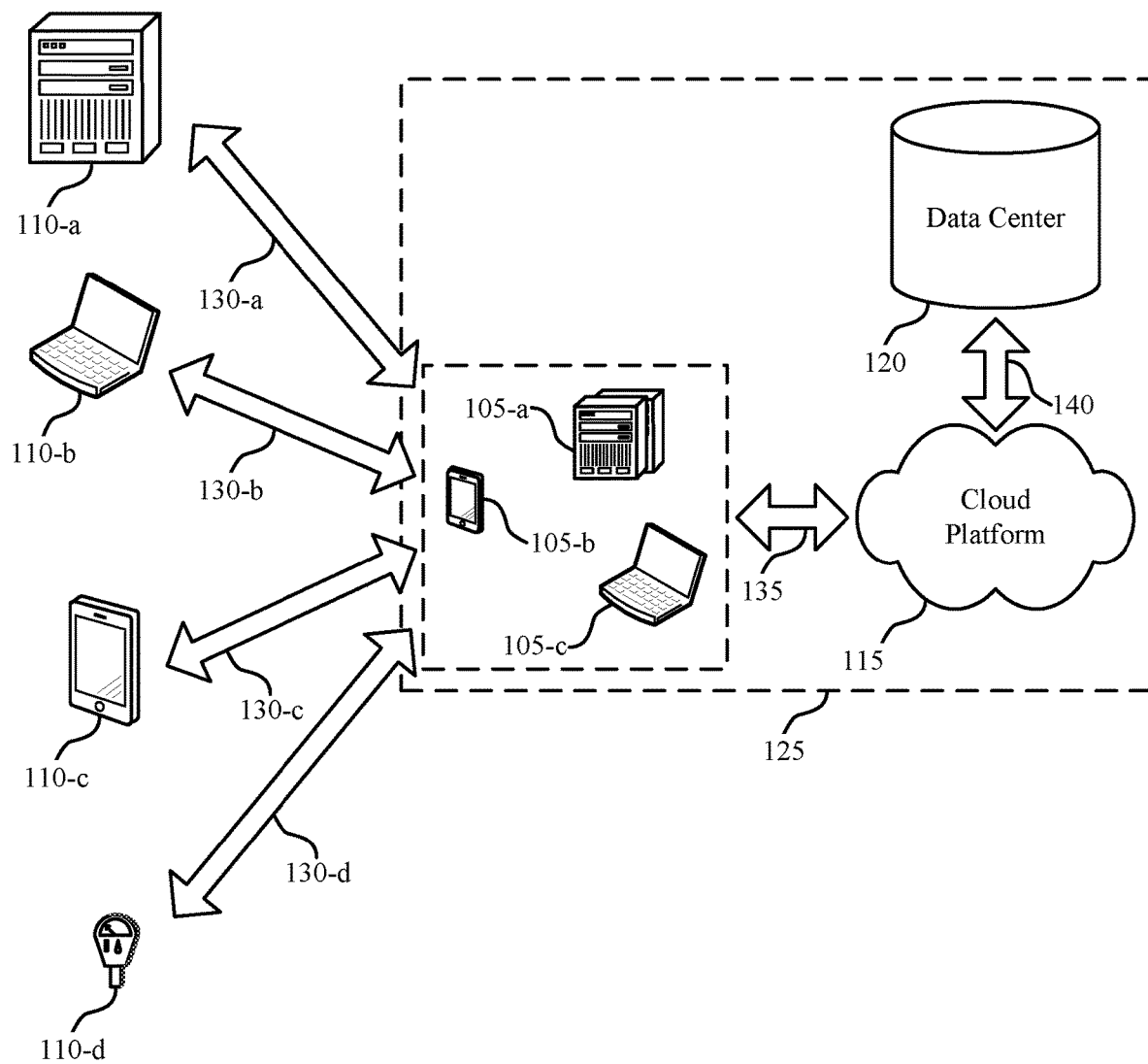
FIG. 1 illustrates an example of a system for cloud computing that supports data object aggregation to manage an order summary in accordance with aspects of the present disclosure.

A database system may store order information for an organization. This order information may include any data related to an agreement between the organization and a user or other organization to provision services or deliver products. For example, the order information may span a number of steps of an order lifecycle, including order creation, order changes, order fulfillment, shipping, payment, or any combination of these and other processes associated with an order. One or more of the different steps in the order lifecycle may correspond to different domains (e.g., with different systems providing the data relevant to that step). For example, the database system may receive order creation information from the organization, payment information from a bank, shipping information from a carrier, etc. The data associated with these different processes may be stored as different types of data objects, in different data formats, with different data fields, or a combination thereof. In some cases, these data objects are stored as immutable data objects (e.g., within a transaction order) at the database system to maintain data integrity. However, such an implementation for data storage may result in significant processing latency when querying for order information. For example, in response to a query, the database system may retrieve data from multiple different data objects—in some cases, across different databases or domains—in order to aggregate information representing the full lifecycle of the order.

To efficiently store order information for low-latency querying and data consistency, the database system may implement order summaries. An order summary may track the current state of an order, automatically updating as additional order information is received at the database system (e.g., across any number of systems or domains). For example, a database server may receive a new order data object associated with an order identifier and may create a corresponding order summary data object associated with the order identifier. If the database system receives any additional data objects associated with the same order identifier, the database server may update the order summary data object based on the additional data objects. In some cases, the updating may involve aggregating fields across multiple data objects, replacing field values with updated field values, creating new field values based on new information, or any combination thereof. The order summary data object may additionally include references (e.g., links, pointers, etc.) to the underlying data objects upon which the order summary data object is based. In some cases, these underlying data objects may be stored as immutable data objects in the database system to maintain data integrity, while the order summary data objects support modification in the storage system.

The order summary data objects may support efficient querying of order information. For example, because an order summary data object can track a current state of an order, the database server may handle queries for information associated with the order using the order summary data object. That is, rather than querying multiple data objects and aggregating information on-the-fly in order to respond to a query, the database server may retrieve a response to the query directly from the order summary data object based on the order summary data object containing aggregate information for multiple data objects associated with the order. Retrieving a value directly from an order summary data object may support low-latency querying, as the database server may not search for multiple different data objects across the database system. This efficient query handling may support real-time or pseudo-real-time user interface updates, as selections or changes made by a user in the user interface may be handled by a single data object at the database system (or by a single data object stored locally in memory of the user device displaying the user interface).

Additionally, as the database system automatically updates the order summary data object based on receiving new data objects associated with the order, the user interface—that is based on the order summary data object—may also automatically update as the new data objects are received at the database system. This may allow the user interface to display, in a single view, up-to-date information for the current state of an order. The order summary data objects may support organization-facing user interfaces, customer-facing user interfaces, or both. Additionally or alternatively, the database system may be an example of a multi-tenant database system and may store order summary data objects for multiple different tenants.

Aspects of the disclosure are initially described in the context of an environment supporting an on-demand database service. Additional aspects of the disclosure are described with reference to an order transaction system, a user device, an order lifecycle, and a data aggregation process flow. Aspects of the disclosure are further illustrated by and described with reference to apparatus diagrams, system diagrams, and flowcharts that relate to data object aggregation to manage an order summary.

FIG. 1 illustrates an example of a system 100 for cloud computing that supports data object aggregation to manage an order summary in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may support order management at a database system. For example, cloud clients 105 may store information related to orders placed by contacts 110 in the data center 120, the cloud platform 115, or both. This order information may originate from multiple different data domains associated with the full life cycle of an order (e.g., including order creation, order modification, order fulfillment, shipping, payment, return requests, or any combination of these or other operations or actions related to an order placed by a user). The system 100 may provide a summary of an order across the history of the order and may combine the different actions that can happen to the order into a usable view. The system 100 may present this view to a user (e.g., a cloud client 105, a contact 110, etc.) in a user interface of a user device.

In some other systems, different applications, platforms, or databases may store order information across multiple data domains. In some cases, an order may include multiple data objects, and the multiple data objects may be stored in multiple different data domains. Order information may be maintained through the creation of an original order as well as one or more change orders. In some examples, each change order may be associated with the original order. Maintaining the original order and the related change orders separately may increase system latency when calculating information related to an order. For example, to retrieve information related to the order (e.g., incorporating multiple steps in the order history), information from the original order as well as one or more subsequent change orders may be queried to determine the order-related information. Querying multiple data objects, multiple data domains, or both may significantly increase the processing latency associated with handling the query. Such latency may impact the usability of a user interface displaying the order information, especially for real-time or pseudo-real-time user interfaces.

In contrast, the system 100 may implement order summary data objects to manage orders. In some cases, order summaries may improve the efficiency of generating and/or accessing information related to orders. In some examples, order summaries may improve user experience. For example, order summaries may accurately and efficiently provide insights into a current state of an order. In some cases, an order summary may provide an efficient way to extract and/or generate information related to an order.

An order summary may maintain one or more order-related data fields. In some cases, an order summary may be created when an order (e.g., an original order associated with a particular order identifier) is created. In some examples, the order summary may be updated when an additional data object related to the order (e.g., a change order, a fulfillment order, a return order, etc.) is created or received. Accordingly, an order summary may include and/or be associated with one or more database objects. For example, an order summary may be associated with one or more tables, views, tuples, indexes, etc. In some examples, an order summary may be identified and/or updated when a change order is received. For example, one or may fields included in an order summary may be updated when a change order is received. In some cases, one or more fields of the order summary may be updated based on one or more existing values associated with the order summary and/or one or more values associated with the change order. Updating an order summary may be performed in a constant asymptotic time complexity (e.g., O(1)). For example, an amount of time associated with updating an order summary may not be affected by the number of change orders associated with an original order. In some cases, an original order may be associated with numerous change orders.

Retrieving values associated with an order (e.g., a cost associated with an order, an amount of tax associated with an order, payment information related to an order, coupons related to an order, shipping information related to an order, account information related to an order, returns related to an order, etc.) based on an order summary may decrease system latency, improve system efficiency, and improve user experience. For example, to query order-related information, the system may determine the query results from the order summary data object, rather than querying multiple different underlying data objects that form the foundation of the order summary data object.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
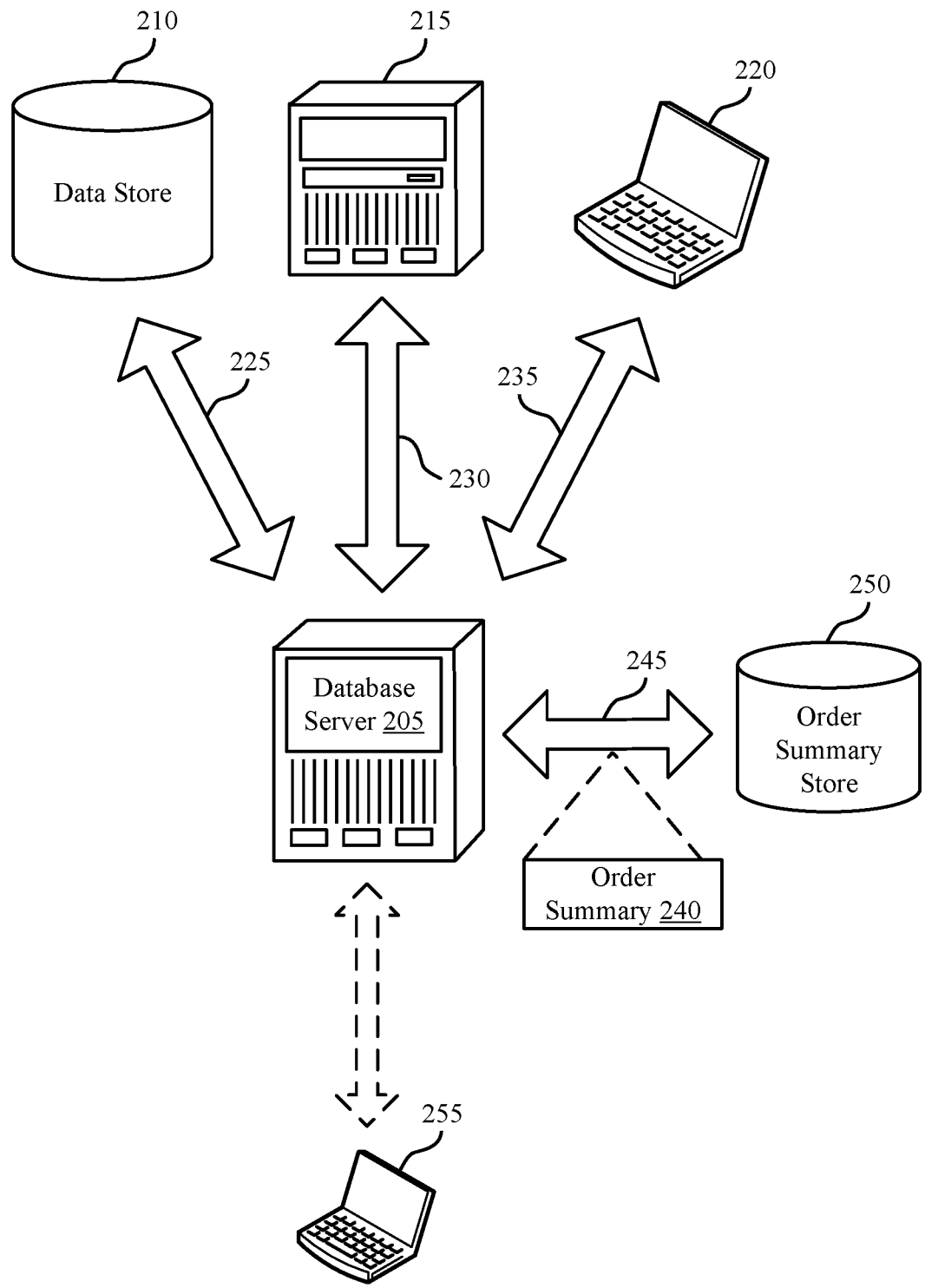
FIG. 2 illustrates an example of a system that supports data object aggregation to manage an order summary in accordance with aspects of the present disclosure.

FIG. 2 illustrates an example of a system 200 that supports data object aggregation to manage an order summary in accordance with aspects of the present disclosure. The system 200, which may be an example of an order transaction system, includes a database server 205, a data store 210, an application server 215, a client 220 (e.g., associated with a client device), a data store connection 225, an application server connection 230, a client connection 235, an order summary store connection 245, an order summary store 250, and a user device 255. The system 200 may implement aspects of the system 100 as described with reference to FIG. 1. For example, a database server 205, a data store 210, an order summary store 250, a data store connection 225, or a combination thereof may be examples or components of a data center 120. An application server 215, a client 220, an application server connection 230, a client connection 235, or a combination thereof may implement aspects of subsystem 125 as described with reference to FIG. 1.

The database server 205 may represent aspects of an application server, communication server, data processing server, database server, cloud-based server, server cluster, virtual machine, container, or some similar data processing device or system. The database server 205 may communicate with other devices such as the data store 210, the application server 215, the client 220, the order summary store 250, and the user device 255. The data store 210 and/or the order summary store 250 may implement various database ideologies (e.g., relational, non-relational, atomicity/consistency/isolation/durability (ACID), etc.). In some cases, the data store 210 and/or the order summary store 250 may be relational databases (e.g., relational database management systems (RDBMSs)). Additionally or alternatively, the order summary store 250 may be a component of the data store 210. The database server 205 may use the data store connection 225 to receive data from and/or transfer data to the data store 210. The database server 205 may use the application server connection 230 to receive data from and/or transfer data to the application server 215. The database server 205 may use the client connection 235 to receive data from and/or transfer data to the client 220 (e.g., a user device, a client application, a client server, etc.). The connections may be shared connections (e.g., connections allowing multiple users or processes to connect to a database), unshared connections (e.g., connections allowing a single user or process to connect to a database), or a combination thereof. The connections may implement one or more security techniques to ensure that the secure transfer of tenant data.

In some cases, the database server 205 may create and/or identify an order (e.g., an original order). This order may be a data object including information related to an agreement between entities to provision services or deliver products.

The order may be referred to as a user order, a customer order, a business order, a client order, or an employee order. In some cases, information related to the order may be stored in—or received from—multiple data domains (e.g., data store 210, one or more application servers 215, one or more clients 220, etc.). For example, order information may be queried or received via one or more application programming interfaces (APIs) associated with different systems or domains. In some cases, one or more additional data objects (e.g., change orders, fulfillment orders, return orders, etc.) may be associated with the order. In some examples, information related to the one or more additional orders may be stored in—or received from—multiple data domains. The information related to the one or more additional orders may be stored in the same data domains as the order, different data domains than the order, overlapping data domains, or any combination thereof.

In some cases, an order state (e.g., a current state) may reflect the original order data object and all other data objects associated with the original order. For example, one or more change orders may be associated with an original order and may alter an order state. In some cases, the database server 205 may create an order summary data object 240 when an original order is created. An order summary data object 240 may reflect the current state of an order. In some examples, aspects of the order summary data object 240 may be read-only to a user. For example, order data contained in the order summary data object 240 may be displayed as read-only data at a user interface. However, the order data may be updated based on received data objects associated with the order.

In some examples, an order summary data object 240 may provide a summary across the history of an order. For example, the order summary data object 240 may combine different actions that can happen to an order into a usable view so that a user may be presented with an easy to use view of an order's current state. In some examples, an order summary data object 240 may be presented as a single view that represents the current state of an order (e.g., in a user interface of a user device 255). In some examples, an order summary data object 240 may include fulfillment states, order changes, returns, or any combination thereof. In some cases, an order summary data object 240 may exist based on an original order (i.e., an order data object including a new order identifier for which no data objects are currently stored at the data store 210). The order summary data object 240 may inherit security setting, privacy settings, or both form the order data object. In some cases, additional data objects associated with the same order may update the security/privacy settings for the order summary data object 240.

The database server 205 may store an order summary data object 240 in an order summary store 250. The database server 205 may use an order summary store connection 245 (e.g., a database connection) when connecting to the order summary store 250. In some examples, the database server 205 may issue a database command (e.g., a query) to the order summary store 250 over the order summary connection 245 to update the order summary store 250. In some examples, an original order may be created at the application server 215, at the client 220, in response to an event at the application server 215, or in response to an event at the client 220. Additionally, the application server 215 or client 220 may create or trigger the creation of a change order (e.g., to cancel an item, return an item, etc.) related to the original order. In some examples, the data store 210 may store data objects representing the original order and the change order. The database server 205 may create an order summary data object 240 based on the original order and may update the order summary data object 240 based on the change order (e.g., if the original order and the change order are associated with a same order identifier). In this way, the order summary data object 240 may be maintained based on stacks of transactional records.

In some cases, the database server 205 may query one or more data domains (e.g., the data store 210, one or more application servers 215, one or more clients 220, etc.) to obtain information related to the state of the order. However, these queries may be performed using backend processing to keep the state of the order summary data object 240 up-to-date, rather than in response to a query for the current state of the order summary data object 240. These different domains may store data in different forms, in different formats, using different data objects, using different data object types, etc. The database server 205 may convert information received from multiple domains into data formats supported by the data store 210. Additionally, the converted information may support data aggregation from multiple different data objects and/or data object types into the order summary data object 240. The aggregation may involve calculating a field value at the order summary data object 240 based on field values at the received data objects, creating a field value based on a field value at a received data object, replacing a field value based on a field value at a received data object, or some combination thereof. These fields may be default fields or custom fields and may exist in one or more of the received data objects or may be order summary-specific. The changes to the order summary data object 240 may be automatically triggered based on a new data object associated with the same identifier, and the changes may be iterative (e.g., the database server 205 may not query previously received data objects associated with the same identifier to update the order summary data object 240).

To store an order summary data object 240 that accurately reflects the current state of an order, the database server 205 may perform one or more data aggregation techniques. For example, the database server 205 may perform functions, calculations, transformations, correlations, searches, or any combination thereof on information obtained from one or more data domains to reflect the state of an order in the order summary data object 240. As data objects are received or created at the database server 205, the database server 205 may determine if the data objects are associated with a specific order summary data object 240. For example, the order summary data object 240 may be associated with a particular order identifier, and each associated data object (e.g., change order data objects, fulfillment order data objects, payment data objects, etc.) may be associated with the same particular order identifier. As such, the database server 205 may automatically identify the associated data objects and may update the order summary data object 240 based on the associated data objects (e.g., in real-time or pseudo-real-time). This may allow the database server 205 to keep the order summary data object 240 on disk and up-to-date with the current state of the order.

In some cases, the database server 205 may include the information obtained from the one or more data domains, or information derived from the information obtained from the one or more data domains, in the order summary data object 240. In some cases, data objects associated with an order summary data object 240 (e.g., change orders) may be indexed to improve system performance. Additionally or alternatively, an order summary data object 240 may be referenced via a key (e.g., a foreign key). In some cases, the order summary data object 240 may be constructed and/or designed to improve system performance. For example, the order summary data object 240 may contain a primary key, one or more foreign keys, or one or more indexes that support efficient querying. In some examples, the order summary store 250 may be configured for reliable and/or efficient querying (e.g., based on transaction-based querying, one or more high bandwidth connections, proximity to the database server 205, etc.).

In some cases, a user device 255 may communicate or otherwise interact with the database server 205. In some examples, the user device 255 may display information in a user interface based on an order summary data object 240. For example, the order summary data object 240 may contain up-to-date information for the current state of an order, and the user device 255 may display some or all of the information stored in the order summary data object 240. In some examples, the database server 205 may transmit the order summary data object 240 to the user device 255. The user device 255 may display the user interface based on the order summary data object 240 stored in local memory at the user device 255 (e.g., for low-latency, local querying). In some such examples, the database server 205 may push updates of the order summary data object 240 to the user device 255 (e.g., automatically or based on a user input). Pushing order summary data object 240 updates to the user device 255 may maintain up-to-date order summary information in the user interface.

Figure 3:
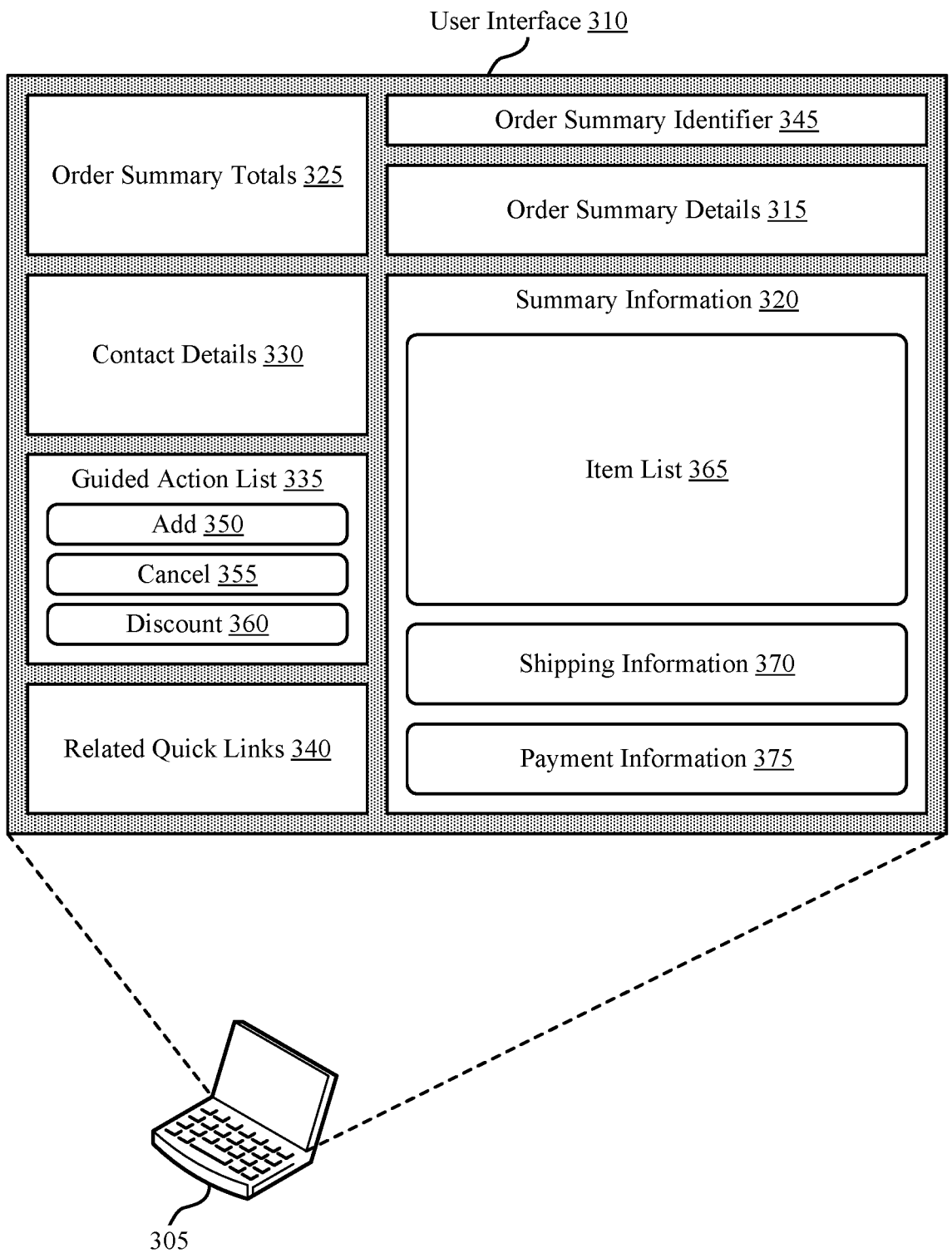
FIG. 3 illustrates an example of a user device including a user interface that supports data object aggregation to manage an order summary in accordance with aspects of the present disclosure.

FIG. 3 illustrates an example of a user device 305 including a user interface 310 that supports data object aggregation to manage an order summary in accordance with aspects of the present disclosure. In some cases, the user interface 310 may provide a single view that represents the current state of an order. The user interface 310 may display data associated with an order summary data object corresponding to an order identifier. In some cases, the user interface 310 may additionally display data associated with other data objects corresponding to the order identifier and related to the order summary data object. As illustrated, the user interface 310 may include an order summary identifier 345, order summary details 315, summary information 320 (e.g., including an item list 365, shipping information 370, payment information 375, etc.), order summary totals 325, contact details 330, a guided action list 335 (e.g., including add 350, cancel 355, discount 360, or some combination of these or other supported actions), and related quick links 340. However, it is to be understood that the user interface 310 represents an example user interface, and other user interface configurations are supported by the techniques and processes described herein.

The user interface 310 may support order summaries as described with reference to FIGS. 1 and 2. In some cases, a user may view and interact with the user interface 310 to understand an order and various aspects of the order. For example, the user may use the user interface 310 to answer questions such as "what items have been cancelled?", "what items can be cancelled?", "what items have been allocated?", "what items can be allocated?", "what items have been fulfilled?", "what items can be fulfilled?", "what items have been returned?", "what items can be returned?", "what items have been invoiced?", etc. In some examples, a user may use the user interface 310 to understand the current state of an order. For example, because the user interface 310 displays data from an order summary that tracks any changes to an order, the user interface 310 can display the current state of an order including any order modifications following the order creation based on a single source (i.e., the order summary data object). For examples, the user interface 310 may display information such as price changes, discounts, shipping addresses, shipping methods, items added, etc. for an order.

The user interface 310 may display information for an order based on the order summary data object created and maintained for that order. The order summary identifier 345 may display the identifying value (i.e., the order identifier) associated with the order. This order identifier may be unique for the order summary data object, where no other order summary data objects include the same order identifier. If the database system receives data objects including the same order identifier, the database system may automatically determine to update the order summary data object based on the received data objects due to the shared order identifier.

In some cases, the order summary details 315 may display order information such as an account name, an order date, a sales channel, a channel type, an order status, or a billing address. In some examples, the order summary details 315 may be used as a high-level summary of the orders, including information that is not specific to any particular item in the order. The summary information 320 may display information related to one or more items within an order. In some examples, the summary information 320 may include multiple selectable tabs. The multiple tabs may include a summary tab, a related tab, a details tab, or some combination of these or other tabs. In some cases, the summary information 320 may display product details for an item list 365, shipping information 370, payment information 375, or a combination thereof. For example, product details may include information related to one or more items in the order, such as a description and/or a number, a status (e.g., ordered, fulfilled, shipped, returned, backordered, etc.), quantity, unit price, adjustment, tax, item total, etc. Shipping information 370 may include information related to shipping such as name, address, shipping method, etc. Payment information 375 may include information related to payments such as method, name, authorized amount, captured amount, etc.

In some cases, the order summary totals 325 may provide information related to the costs of an order. For example, the order summary totals 325 may include fields such as subtotal, adjustments, shipping, tax, total, etc. Additionally or alternatively, the order summary totals 325 may provide information related to returns such as refunds, exchanges, etc. The values displayed in the order summary totals 325 may be retrieved directly from the order summary data object but may be based on multiple different data objects. For example, the database system may receive an order data object and a number of change order data objects and may update fields in the order summary data object representing the order summary totals 325 based on the order data object and the change order data objects. As such, the values in the order summary totals 325 may not be present in any one order data object or change order data object. Instead, based on a data aggregation process across these data objects, the order summary data object may store these values. This may allow a user to tag (e.g., assign a value or flag to) one or more of these values, and the database system may represent this tag in the underlying data based on creating, maintaining, and storing the order summary data object with these values.

In some cases, the contact details 330 may provide contact information related to the order. For example, the contact details 330 may display contact information such as a name, email, phone number, or combination thereof for a user associated with an account that placed the order. Additionally or alternatively, the contact details 330 may display contact information for a person or user that is not associated with the account that placed the order.

In some cases, the guided action list 335 may provide multiple selectable tabs. For example, the guided action list 335 may provide an actions tab and a history tab. In some cases, the guided action list 335 may allow one or more items to be added to an order (via an add 350 action). In some other cases, the guided action list 335 may allow one or more items of an order to be canceled (e.g., via a cancel 355 action). In yet some other cases, the guided action list 335 may allow one or more items of an order to be discounted (e.g., via a discount 360 action). In some examples, the guided actions list 335 may display a history of actions associated with an order. For example, the guided actions list 335 may display items that have been added to an order, items that have been canceled from an order, or items that have been discounted on an order. Additionally or alternatively, the guided actions list 335 may be filterable and allow current actions and/or past actions to be filtered based on various criteria. For example, the actions may be filtered based on a date, a time, a date range, a time range, a type of action, an item quantity or quality, a user associated with an order, or any combination thereof.

In some cases, the related quick links 340 may provide links related to one or more orders. These links may allow a user to view or access one or more of the data objects associated with the order summary data object. For example, the related quick links 340 may link to the original order, change orders, fulfillment orders, return orders, payments, shipping notifications, etc. In a specific example, the related quick links 340 may provide a fulfillment orders link. For example, the fulfillment orders link may allow a user to view one or more fulfillment orders related to the order. In some cases, all fulfillment orders associated with the order may be displayed when the fulfillment orders link is selected. The fulfillment orders link may display a numeric value representing how many fulfillment orders are associated with the order. In some cases, the fulfillment orders link may display a visual indication of whether or not there are fulfillment orders associated with the order. In another example, the related quick links 340 may provide a payments link. For example, the payments link may allow a user to view one or more payments related to the order. In some cases, all payments associated with the order may be displayed when the payments link is selected. The payments link may display a numeric value representing how many payments are associated with the order. In some cases, the payments link may display a visual indication of whether or not there are payments associated with the order.

In some cases, the user interface 310 may support user login and/or user account creation. In some examples, the user interface 310 may display information that a user has permission to view and may hide (or otherwise refrain from displaying) other information. For example, the user interface 310 may display information related to orders that were created by the logged in user. Some database systems may support multiple different user interfaces for displaying order summary information. For example, a system may support a first user interface for an administrative user at an organization fulfilling the order and a second user interface for a customer placing the order. The database system may automatically filter the information that may be viewed in each user interface according to the role of the user viewing the user interface. Additionally or alternatively, the database system may support customizable views for users.

Figure 4:
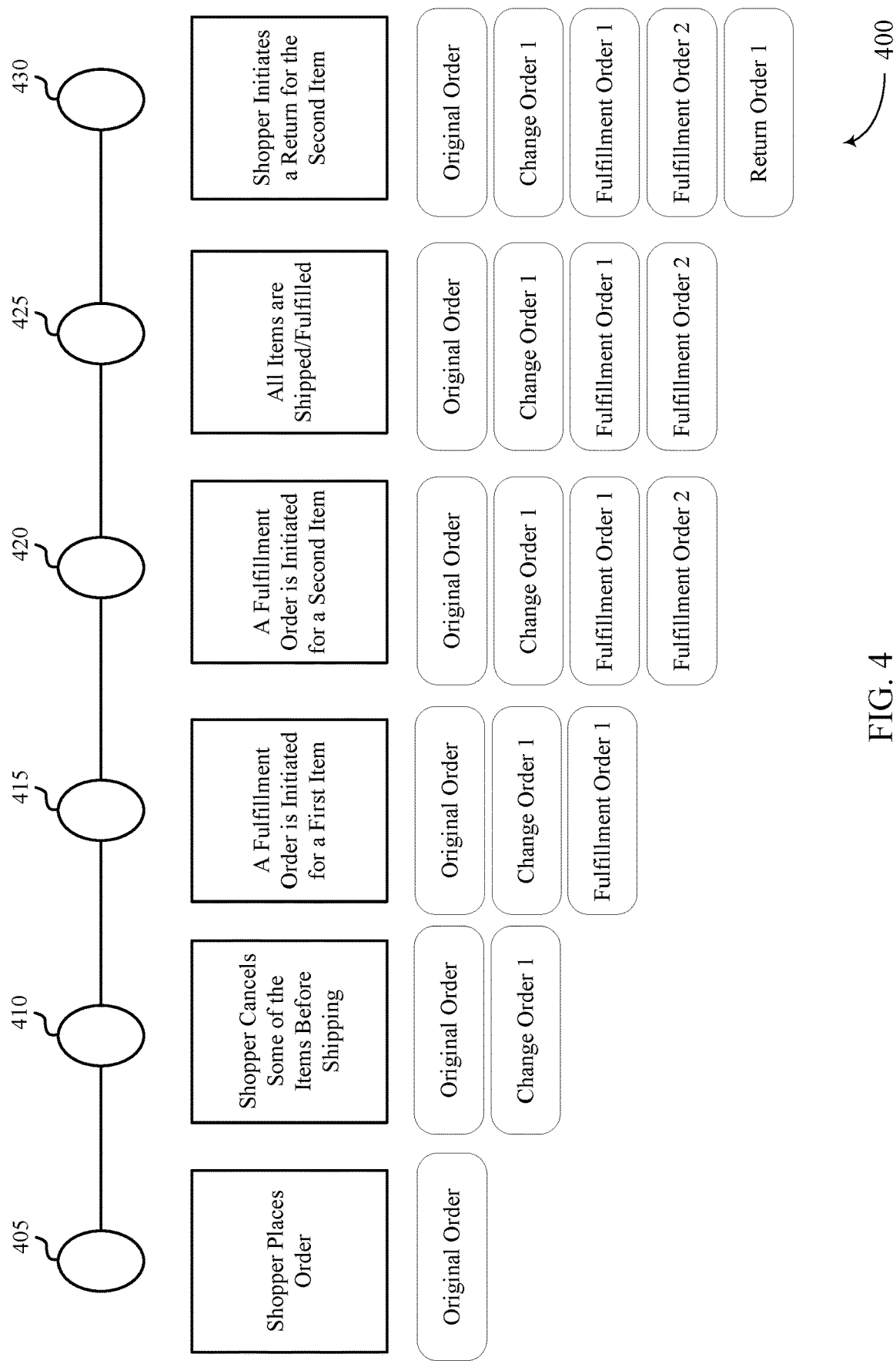
FIG. 4 illustrates an example of an order lifecycle that supports data object aggregation to manage an order summary in accordance with aspects of the present disclosure.

FIG. 4 illustrates an example of an order lifecycle 400 that supports data object aggregation to manage an order summary in accordance with aspects of the present disclosure. In some cases, the order lifecycle 400 may represent one or more events related to an order. For example, the order lifecycle 400 may include an order creation event 405, a change order event 410, a first fulfillment order initiation 415, a second fulfillment order initiation 420, a fulfillment completion event 425, and a return item event 430. However, it is to be understood that an order lifecycle 400 may involve any combination of these or other relevant events in any sequence.

In some cases, an order summary may be created based on an order creation event 405. For example, the creation of an order summary may be triggered by an order creation event 405. In some cases, an order creation event 405 may occur based on a user placing an order. In some cases, an order summary may be updated based on a change order event 410. A change order event 410 may occur based on a user canceling an item in a previously placed order, selecting a new item in a previously placed order, or modifying any other details associated with a previously placed order.

In some cases, a first fulfillment order initiation 415 may occur based on the start and/or completion of an action taken to fulfill the order. For example, a first fulfillment order initiation 415 may be triggered when one or more items of an order are retrieved from a warehouse, packaged for shipping, sent to a shipping service, etc. In some cases, a second fulfillment order initiation 420 may occur based on the start and/or completion of an action taken to fulfill the order. For example, a second fulfillment order initiation 420 may be triggered when one or more items of the order are retrieved from a warehouse, packaged for shipping, sent to a shipping service, etc. As illustrated, a fulfillment order may correspond to a subset of the items in an order. For example, based on item availabilities, different warehouses, shipping services, etc., different portions of an order may be fulfilled at different times. In some cases, a fulfillment completion event 425 may occur based on the fulfillment of all items related to an order. The fulfillment completion event 425 may trigger a change to the status of an order summary. For example, the fulfillment completion event 425 may switch an order status field from "Open" to "Closed" in the order summary data object. In some cases, a return item event 430 may occur based on the return of one or more items related to an order. Such an event may further update the status of the order summary (e.g., switching the order status field from "Closed" to "Open."

Figure 5:
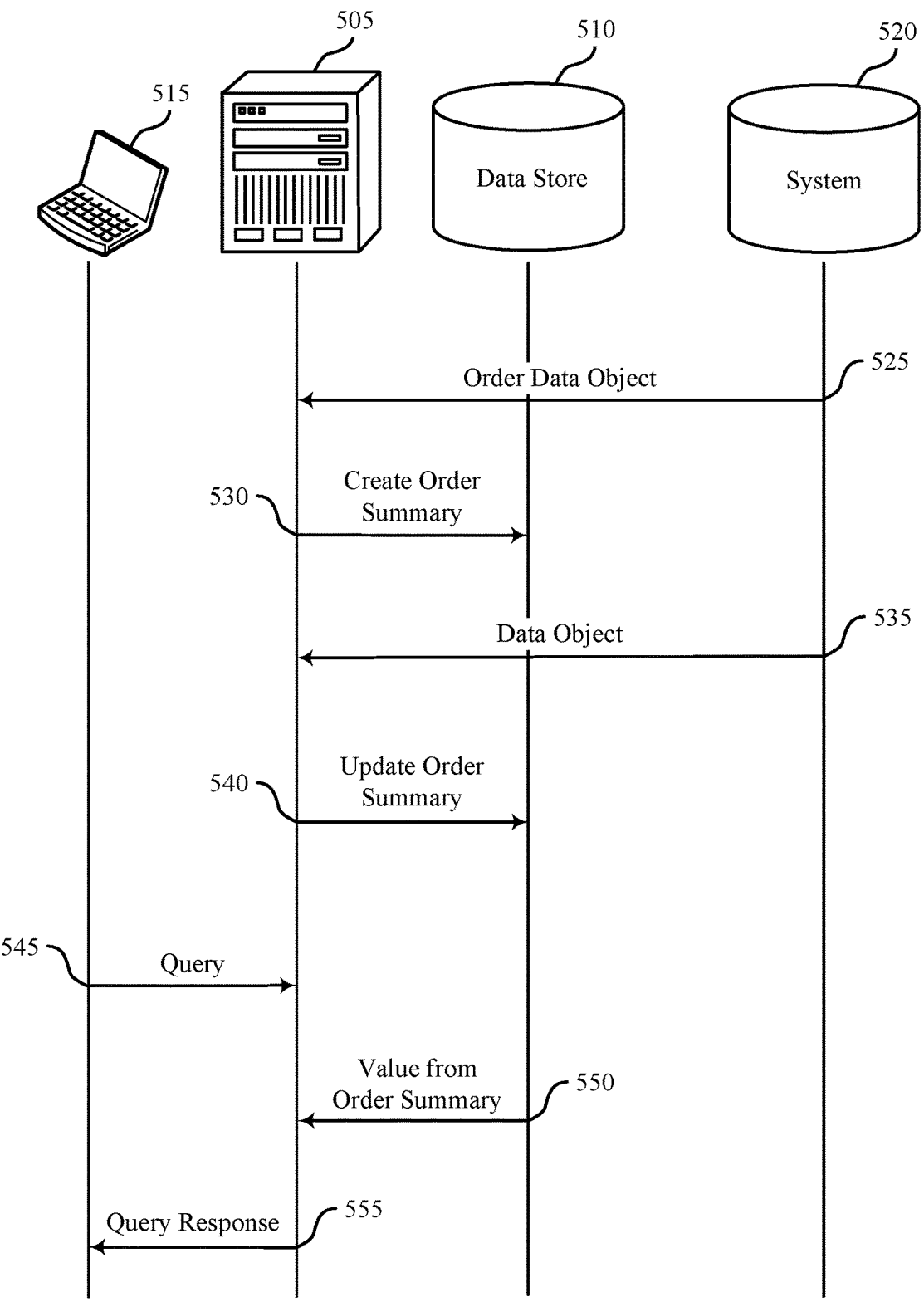
FIG. 5 illustrates an example of a process flow that supports data object aggregation to manage an order summary in accordance with aspects of the present disclosure.

FIG. 5 illustrates an example of a process flow 500 that supports data object aggregation to manage an order summary in accordance with aspects of the present disclosure. The process flow 500 includes a database server 505, a data store 510 associated with the database server 505, a user device 515, and one or more systems 520 associated with one or more domains. These may be examples of the corresponding devices described with reference to FIGS. 1 through 4. The database server 505 may generate and update an order summary in the data store 510. In some cases, a user device 515 may query the database system (e.g., the database server 505, the data store 510, or both) for information related to the order summary. For example, the user device 515 may query the database system for order data to display in a user interface. Alternative examples of the following may be implemented, where some steps are performed in a different order than described or are not performed at all. In some cases, steps may include additional features not mentioned below, or further steps may be added.

At 525, the database server 505 may receive an order data object from a system 520. For example, the system 520 may be an application, an API, a user device, a database, etc. In some cases, the order data object may include an order identifier (e.g., a number, a set of characters, etc.). In some cases, the database server 505 may receive the order data object based on the creation of an order (e.g., an original order).

At 530, the database server 505 may create an order summary (e.g., an order summary data object). The database server 505 may create the order summary data object based on receiving the order data object. In some cases, the database server 505 may store the order summary data object in a data store 510. In some examples, the data store 510 may be a relational database or a non-relational database. The order summary data object may include information related to a current state associated with the order identifier. In some cases, the database server 505 may determine that the data store 510 does not contain an existing order summary data object corresponding to the order identifier and may create the order summary data object based on the determination that data store 510 does not contain an existing order summary corresponding to the order identifier. In some cases, the database server 505 may create or update a key (e.g., a foreign key) of the order data object. In some cases, the key may reference a key (e.g., a primary key) of the order summary data object.

At 535, the database server 505 may receive an additional data object. In some cases, the additional data object may be associated with the order identifier. In some cases, the additional data object may be stored with a primary key and a foreign key referencing another data object (e.g., an order data object). The database server 505 may receive the additional data object from a system 520, where the order data object and the additional data object may be received from different systems 520 (or different domains).

At 540, the database server 505 may update the order summary data object. For example, the database server 505 may update the order summary data object based on the additional data object. In some cases, the database server 505 may create or update one or more keys associated with the order summary data object. For example, the database server 505 may create or update a key (e.g., a foreign key) of the order summary data object. In some cases, the key may reference a key (e.g., a primary key) of the additional data object, the order data object, or both. That is, a first reference of the order summary data object may reference the order data object and a second reference of the order summary data object may reference the additional data object. The database server 505 may additionally or alternatively aggregate information from the additional data object with information already stored for the order summary (e.g., based on the order data object) to update field values stored for the order summary data object.

At 545, the database server 505 may receive a query. In some cases, the query may be for a value corresponding to a first field value associated with the order data object and a second field value associated with the additional data object. The query may include the order identifier. In some cases, the query may be based on a user selection at a user device 515 initiating a query. In some cases, the query may be initiated from a user interface, such as user interface 310 as described with reference to FIG. 3.

At 550, the database server 505 may retrieve the value directly from the updated order summary data object in response to the query. For example, rather than aggregating information from the order data object and the additional data object on-the-fly to handle the query, the database server 505 may handle the query using a stored value at the updated order summary data object. By handling the query using a single data object (i.e., the order summary data object) rather than multiple data objects, the database server 505 may reduce the latency involved in updating an order summary user interface. This may support a real-time user interface, where a real-time time constraint associated with real-time applications may be met by the low-latency query handling (e.g., based on the order summary data object). In some cases, the value may be retrieved from the updated order summary data object based on the updated order summary data object including information for both the order data object and the additional data object. At 555, the database server 505 may send a query response to the user device 515 including at least the value retrieved from the updated order summary data object.

Figure 6:
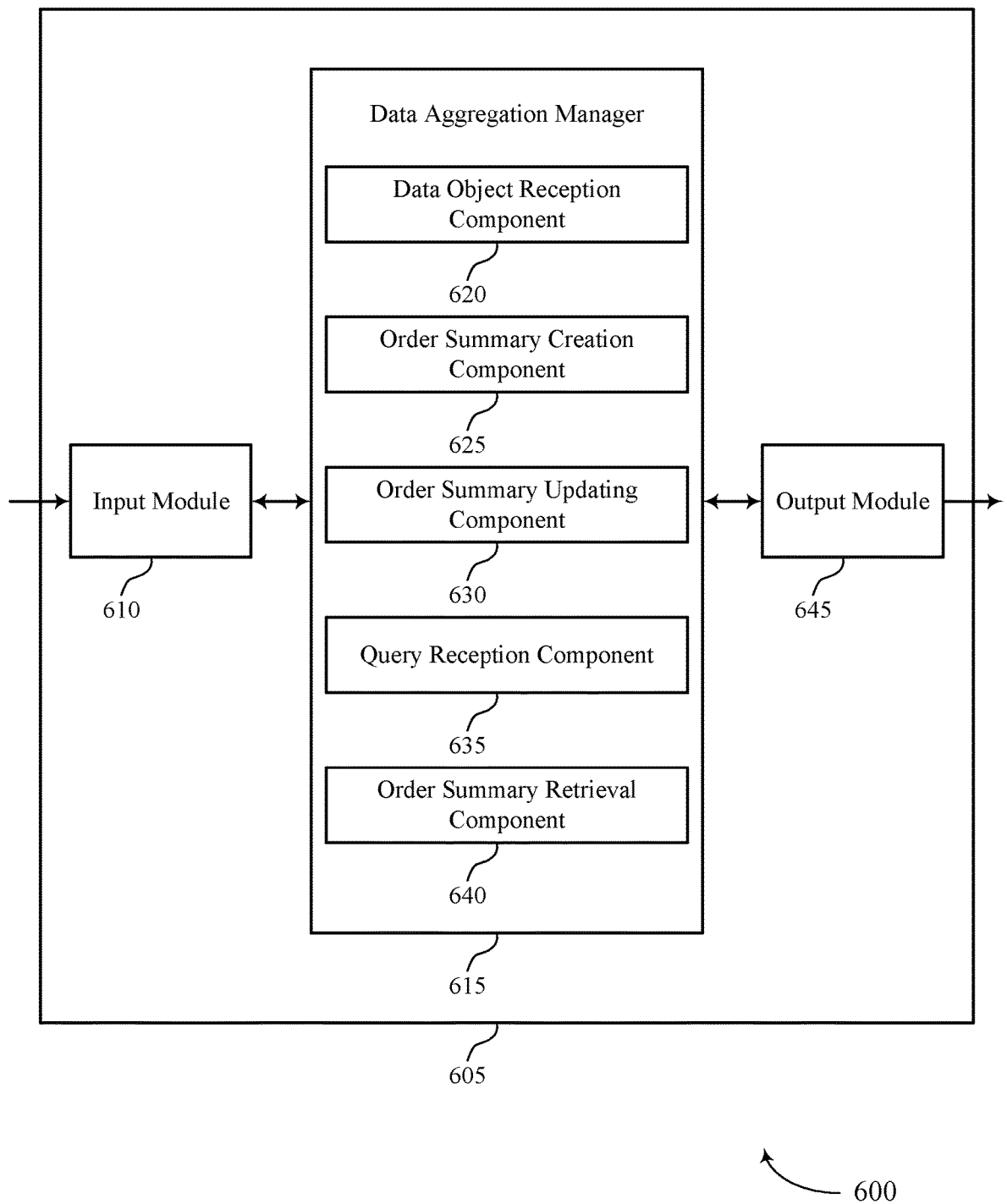
FIG. 6 shows a block diagram of an apparatus that supports data object aggregation to manage an order summary in accordance with aspects of the present disclosure.

FIG. 6 shows a block diagram 600 of an apparatus 605 that supports data object aggregation to manage an order summary in accordance with aspects of the present disclosure. The apparatus 605 may include an input module 610, a data aggregation manager 615, and an output module 645. The apparatus 605 may also include a processor. Each of these components may be in communication with one another (e.g., via one or more buses). In some cases, apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data aggregation manager 615 to support data object aggregation to manage an order summary. In some cases, the input module 610 may be a component of an input/output (I/O) controller 815 as described with reference to FIG. 8.

The data aggregation manager 615 may include a data object reception component 620, an order summary creation component 625, an order summary updating component 630, a query reception component 635, and an order summary retrieval component 640. The data aggregation manager 615 may be an example of aspects of the data aggregation manager 705 or 810 described with reference to FIGS. 7 and 8.

The data aggregation manager 615 and/or at least some of its various sub-components may be implemented in hardware, software executed by a processor, firmware, or any combination thereof. If implemented in software executed by a processor, the functions of the data aggregation manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data aggregation manager 615 and/ or at least some of its various sub-components may be physically located at various positions, including being distributed such that portions of functions are implemented at different physical locations by one or more physical devices. In some examples, the data aggregation manager 615 and/or at least some of its various sub-components may be a separate and distinct component in accordance with various aspects of the present disclosure. In other examples, the data aggregation manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data aggregation manager 615 may be implemented at a server (e.g., a database server, an application server, a server cluster, a virtual machine, a container, etc.) of a database system. The data object reception component 620 may receive an order data object including an order identifier. The order summary creation component 625 may create an order summary data object based on receiving the order data object.

Furthermore, the data object reception component 620 may receive an additional data object associated with the order identifier. The order summary updating component 630 may update the order summary data object based on the additional data object.

The query reception component 635 may receive a query for a value corresponding to a first field value at the order data object and a second field value at the additional data object, where the query includes the order identifier. The order summary retrieval component 640 may retrieve, in response to the query, the value directly from the updated order summary data object based on the updated order summary data object including information for both the order data object and the additional data object.

The output module 645 may manage output signals for the apparatus 605. For example, the output module 645 may receive signals from other components of the apparatus 605, such as the data aggregation manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
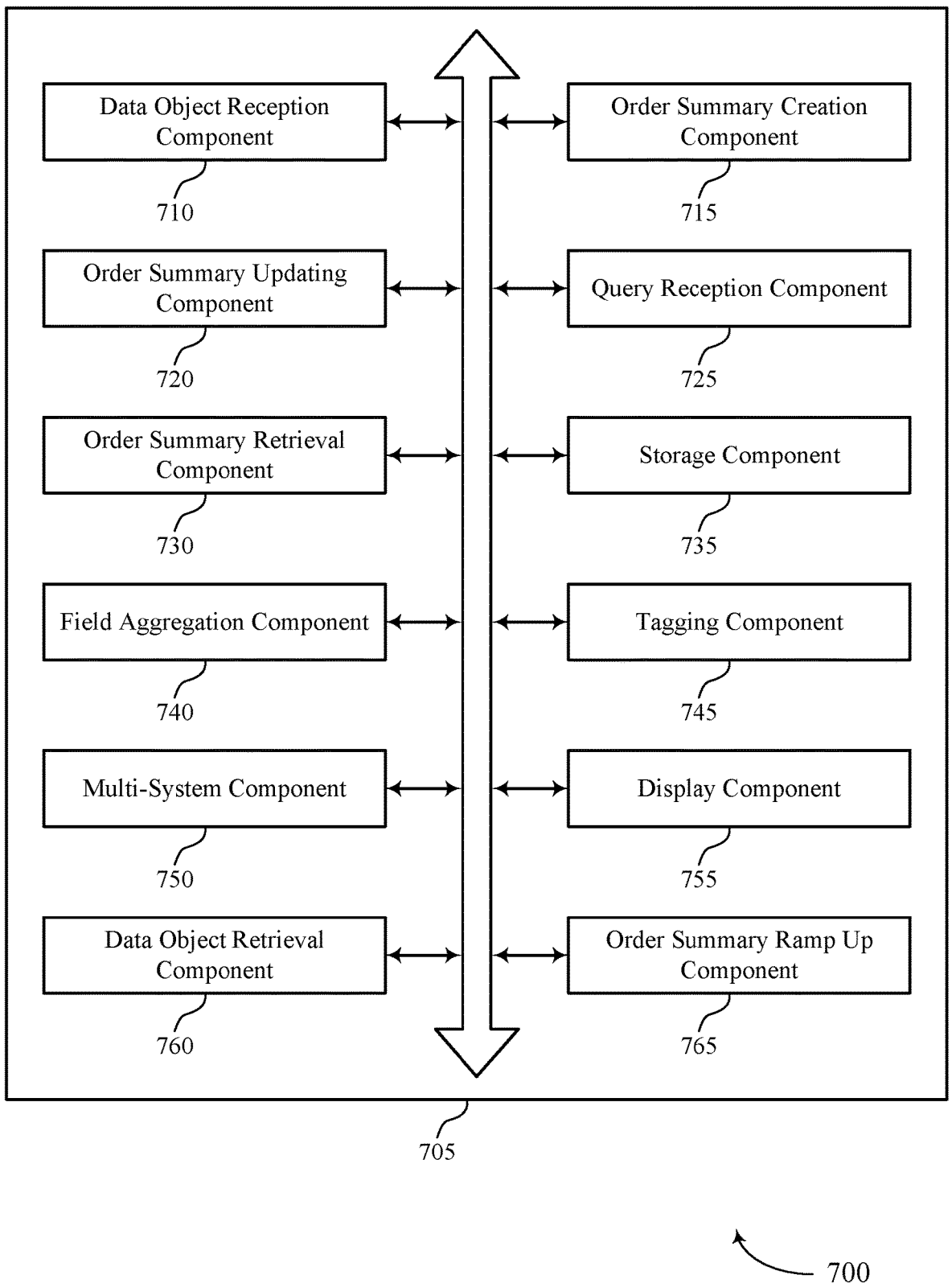
FIG. 7 shows a block diagram of a data aggregation manager that supports data object aggregation to manage an order summary in accordance with aspects of the present disclosure.

FIG. 7 shows a block diagram 700 of a data aggregation manager 705 that supports data object aggregation to manage an order summary in accordance with aspects of the present disclosure. The data aggregation manager 705 may be an example of aspects of a data aggregation manager 615 or a data aggregation manager 810 described herein. The data aggregation manager 705 may include a data object reception component 710, an order summary creation component 715, an order summary updating component 720, a query reception component 725, an order summary retrieval component 730, a storage component 735, a field aggregation component 740, a tagging component 745, a multi-system component 750, a display component 755, a data object retrieval component 760, an order summary ramp up component 765, or any combination of these or other components for order summary management. Each of these modules may communicate, directly or indirectly, with one another (e.g., via one or more buses).

The data aggregation manager 705 may support data object aggregation at a database system. The data object reception component 710 may receive an order data object including an order identifier. The order summary creation component 715 may create an order summary data object based on receiving the order data object. In some cases, the order summary data object inherits field-based security parameters from the order data object. Additionally or alternatively, in some examples, the order summary creation component 715 may determine, upon receiving the order data object, that the database system does not currently store an existing order summary data object corresponding to the order identifier, where the order summary data object is created based on the determining that the database system does not currently store the existing order summary data object.

The data object reception component 710 may receive an additional data object associated with the order identifier. The order summary updating component 720 may update the order summary data object based on the additional data object. In some examples, the order summary updating component 720 may determine, upon receiving the additional data object, that the database system currently stores the order summary data object corresponding to the order identifier, where the order summary data object is updated based on the determining that the database system currently stores the order summary data object.

In some cases, the additional data object may be an additional order data object, a change order data object, a fulfillment order data object, or a return order data object. In some cases, the additional data object is an additional order data object associated with the order identifier and the updating includes replacing current order information for the order summary data object including first order information associated with the order data object with second order information associated with the additional order data object. In some other cases, the additional data object is a change order data object associated with the order identifier and the updating includes modifying the current order information for the order summary data object from the first order information associated with the order data object based on third order information associated with the change order data object. In yet some other cases, the additional data object is a fulfillment order data object associated with the order identifier or a return order data object associated with the order identifier and the updating includes modifying a current status for at least one item in the order summary data object based on the fulfillment order data object or the return order data object.

The query reception component 725 may receive a query for a value corresponding to a first field value at the order data object and a second field value at the additional data object, where the query includes the order identifier. The order summary retrieval component 730 may retrieve, in response to the query, the value directly from the updated order summary data object based on the updated order summary data object including information for both the order data object and the additional data object.

The storage component 735 may store the order summary data object at the database system. For example, the order summary data object may be stored on disk in a database (or stored in local memory, for example, at a user device), rather than calculated on-the-fly. In some cases, the order summary data object may include a current state associated with the order identifier. In some examples, the storage component 735 may additionally store the order data object and the additional data object at the database system, where the order summary data object includes a first indicator referencing the order data object and a second indicator referencing the additional data object.

The field aggregation component 740 may generate an initial value for an aggregate data field of the order summary data object based on the first field value for the order data object and may calculate the value for the aggregate data field of the order summary data object based on the second field value for the additional data object, where the value is retrieved directly from the updated order summary data object based on the calculating.

The tagging component 745 may receive a tag for the value (e.g., based on a user input to a user interface). In some examples, the tagging component 745 may tag the aggregate data field with the tag based on the order summary data object including the value for the aggregate data field, where the order data object and the additional data object do not include the value for tagging. In this way, the database system may tag a current state value at the order summary data object, even if this current state value does not exist elsewhere in the underlying data objects excluding the order summary data object.

The multi-system component 750 may receive first information corresponding to the order data object via a first API for a first system, where receiving the order data object includes generating the order data object based on the first information. The multi-system component 750 may additionally receive second information corresponding to the additional data object via a second API different from the first API for a second system different from the first system, where receiving the additional data object includes generating the additional data object based on the second information. In some cases, the first field value is represented in the first information using a first data format, the second field value is represented in the second information using a second data format different from the first data format, and the value is represented in the updated order summary data object using the first data format, the second data format, or a third data format different from the first data format and the second data format based on converting the first data format to a first converted data format for the order data object, converting the second data format to a second converted data format for the additional data object, or both.

The display component 755 may transmit, for display in a user interface, a set of data associated with the order summary data object, where the query is received based on a user input to the user interface. In some examples, the display component 755 may transmit, for display in the user interface, the retrieved value in response to the query, where the user interface is updated within a real-time time constraint based on retrieving the value directly from the updated order summary data object. In some cases, the user interface is associated with a tenant of the database system, an end-user for the tenant, or both.

In some examples, the query reception component 725 may receive an additional query for an additional value corresponding to a third field value at the order data object, where the additional query includes the order identifier. The data object retrieval component 760 may determine that the order summary data object does not include the additional value and may retrieve, in response to the additional query, the additional value from the order data object based on the order summary data object not including the additional value.

The order summary ramp up component 765 may activate order summaries at the database system. In some examples, the order summary ramp up component 765 may identify an additional order data object including an additional order identifier stored at the database system, may search the database system for one or more additional data objects associated with the additional order identifier, and may build an additional order summary data object corresponding to the additional order identifier based on the additional order data object including the additional order identifier and the one or more additional data objects associated with the additional order identifier. Such processes may be performed when order summaries are turned on for a system. That is, the system may build the corresponding order summary data objects based on information currently stored at the database system (e.g., using background processes, synchronous or asynchronous processing, etc.). Following ramp up, the database system may create further order summary data objects based on new order data objects received at the system (e.g., rather than order data objects currently stored at the system).

Figure 8:
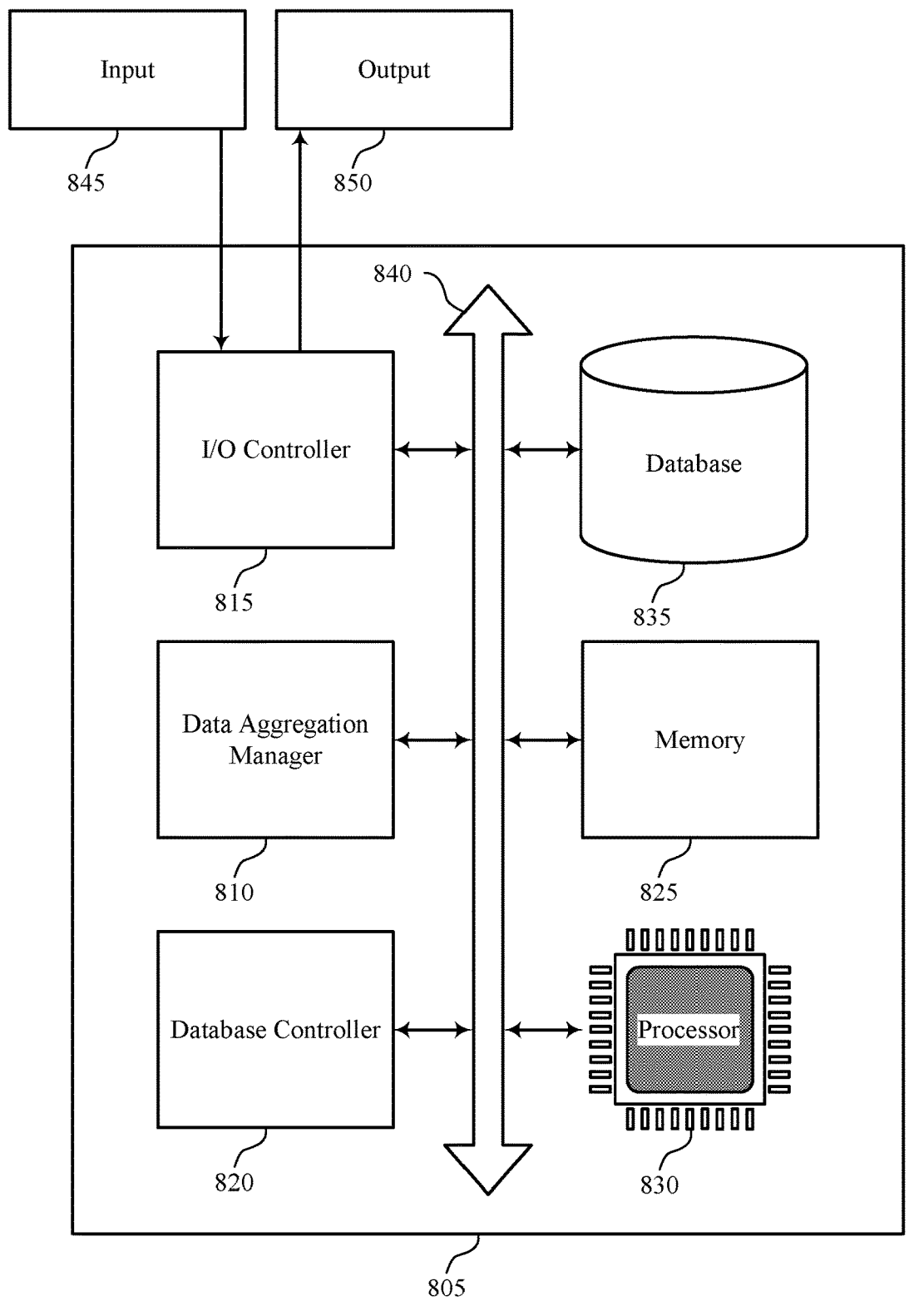
FIG. 8 shows a diagram of a system including a device that supports data object aggregation to manage an order summary in accordance with aspects of the present disclosure.

FIG. 8 shows a diagram of a system 800 including a device 805 that supports data object aggregation to manage an order summary in accordance with aspects of the present disclosure. The device 805 may be an example of or include the components of a database server or an apparatus 605 as described herein. The device 805 may include components for bi-directional data communications including components for transmitting and receiving communications, including a data aggregation manager 810, an I/O controller 815, a database controller 820, memory 825, a processor 830, and a database 835. These components may be in electronic communication via one or more buses (e.g., bus 840).

The data aggregation manager 810 may be an example of a data aggregation manager 615 or 705 as described herein. For example, the data aggregation manager 810 may perform any of the methods or processes described above with reference to FIGS. 6 and 7. In some cases, the data aggregation manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting data object aggregation to manage an order summary).

Figure 9:
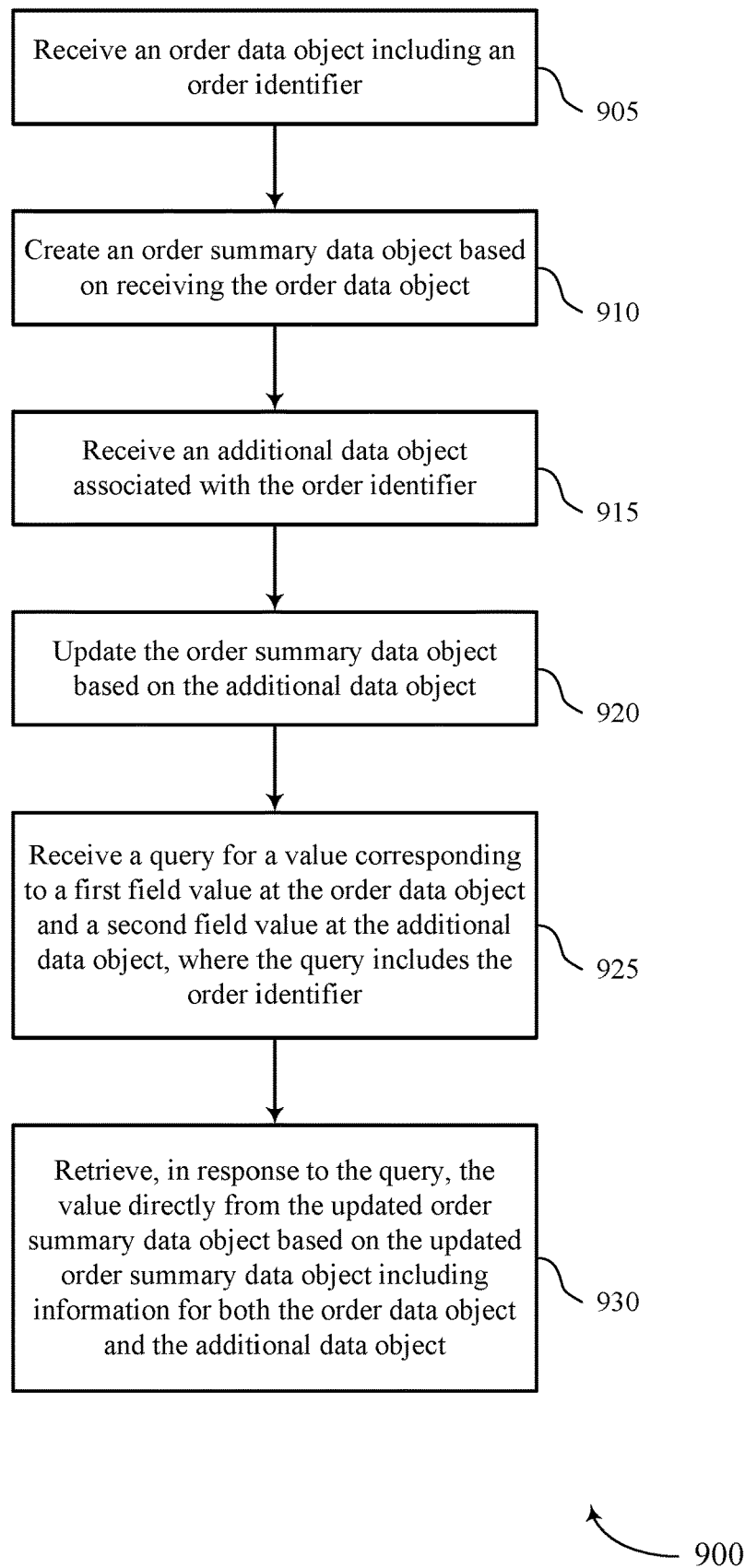
FIGS. 9 through 11 show flowcharts illustrating methods that support data object aggregation to manage an order summary in accordance with aspects of the present disclosure.

FIG. 9 shows a flowchart illustrating a method 900 that supports data object aggregation to manage an order summary in accordance with aspects of the present disclosure. The operations of method 900 may be implemented by a database server or its components as described herein. For example, the operations of method 900 may be performed by a data aggregation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive an order data object including an order identifier. The operations of 905 may be performed according to the methods described herein. In some examples, aspects of the operations of 905 may be performed by a data object reception component as described with reference to FIGS. 6 through 8.

At 910, the database server may create an order summary data object based on receiving the order data object. The operations of 910 may be performed according to the methods described herein. In some examples, aspects of the operations of 910 may be performed by an order summary creation component as described with reference to FIGS. 6 through 8.

At 915, the database server may receive an additional data object associated with the order identifier. The operations of 915 may be performed according to the methods described herein. In some examples, aspects of the operations of 915 may be performed by a data object reception component as described with reference to FIGS. 6 through 8.

At 920, the database server may update the order summary data object based on the additional data object. The operations of 920 may be performed according to the methods described herein. In some examples, aspects of the operations of 920 may be performed by an order summary updating component as described with reference to FIGS. 6 through 8.

At 925, the database server may receive a query for a value corresponding to a first field value at the order data object and a second field value at the additional data object, where the query includes the order identifier. The operations of 925 may be performed according to the methods described herein. In some examples, aspects of the operations of 925 may be performed by a query reception component as described with reference to FIGS. 6 through 8.

At 930, the database server may retrieve, in response to the query, the value directly from the updated order summary data object based on the updated order summary data object including information for both the order data object and the additional data object. The operations of 930 may be performed according to the methods described herein. In some examples, aspects of the operations of 930 may be performed by an order summary retrieval component as described with reference to FIGS. 6 through 8.

Figure 10:
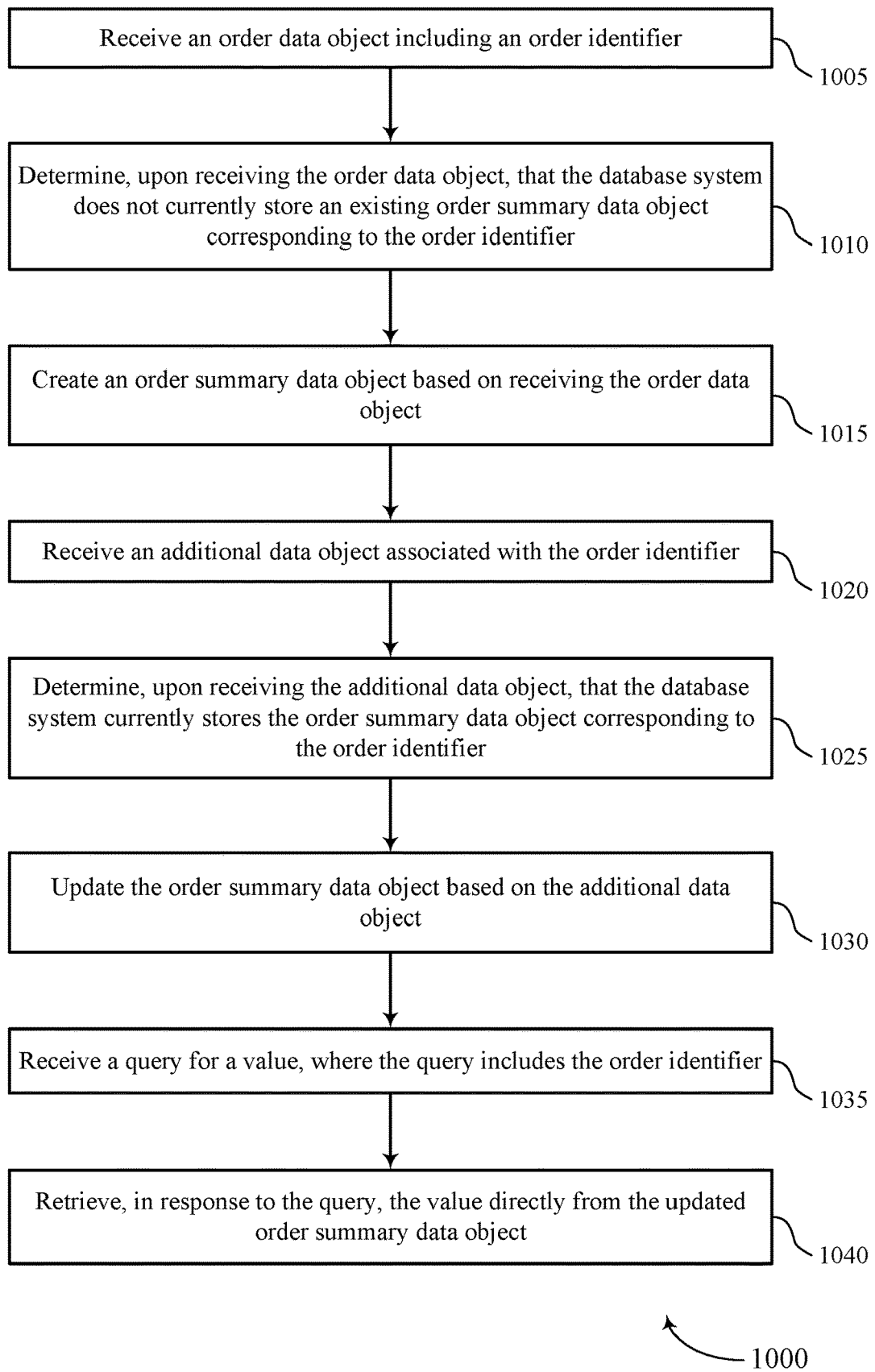

FIG. 10 shows a flowchart illustrating a method 1000 that supports data object aggregation to manage an order summary in accordance with aspects of the present disclosure. The operations of method 1000 may be implemented by a database server or its components as described herein. For example, the operations of method 1000 may be performed by a data aggregation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server (e.g., a database server at a database system) may receive an order data object including an order identifier. The operations of 1005 may be performed according to the methods described herein. In some examples, aspects of the operations of 1005 may be performed by a data object reception component as described with reference to FIGS. 6 through 8.

At 1010, the database server may determine, upon receiving the order data object, that the database system does not currently store an existing order summary data object corresponding to the order identifier. The operations of 1010 may be performed according to the methods described herein. In some examples, aspects of the operations of 1010 may be performed by an order summary creation component as described with reference to FIGS. 6 through 8.

At 1015, the database server may create an order summary data object based on receiving the order data object, where the order summary data object is created based on the determining that the database system does not currently store the existing order summary data object. The operations of 1015 may be performed according to the methods described herein. In some examples, aspects of the operations of 1015 may be performed by an order summary creation component as described with reference to FIGS. 6 through 8.

At 1020, the database server may receive an additional data object associated with the order identifier. The operations of 1020 may be performed according to the methods described herein. In some examples, aspects of the operations of 1020 may be performed by a data object reception component as described with reference to FIGS. 6 through 8.

At 1025, the database server may determine, upon receiving the additional data object, that the database system currently stores the order summary data object corresponding to the order identifier. The operations of 1025 may be performed according to the methods described herein. In some examples, aspects of the operations of 1025 may be performed by an order summary updating component as described with reference to FIGS. 6 through 8.

At 1030, the database server may update the order summary data object based on the additional data object, where the order summary data object is updated based on the determining that the database system currently stores the order summary data object. The operations of 1030 may be performed according to the methods described herein. In some examples, aspects of the operations of 1030 may be performed by an order summary updating component as described with reference to FIGS. 6 through 8.

At 1035, the database server may receive a query for a value corresponding to a first field value at the order data object and a second field value at the additional data object, where the query includes the order identifier. The operations of 1035 may be performed according to the methods described herein. In some examples, aspects of the operations of 1035 may be performed by a query reception component as described with reference to FIGS. 6 through 8.

At 1040, the database server may retrieve, in response to the query, the value directly from the updated order summary data object based on the updated order summary data object including information for both the order data object and the additional data object. The operations of 1040 may be performed according to the methods described herein. In some examples, aspects of the operations of 1040 may be performed by an order summary retrieval component as described with reference to FIGS. 6 through 8.

Figure 11:
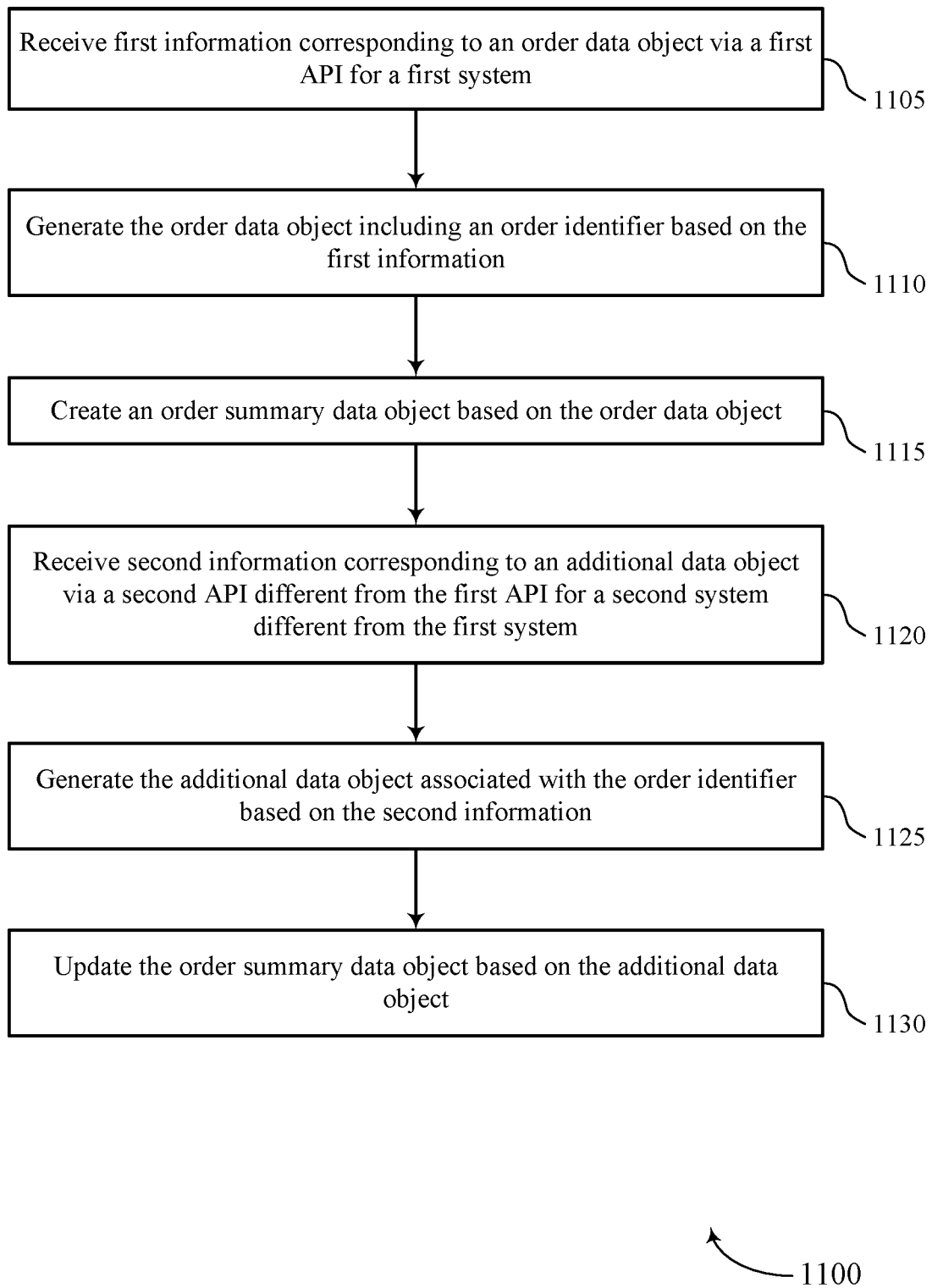

FIG. 11 shows a flowchart illustrating a method 1100 that supports data object aggregation to manage an order summary in accordance with aspects of the present disclosure. The operations of method 1100 may be implemented by a database server or its components as described herein. For example, the operations of method 1100 may be performed by a data aggregation manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive first information corresponding to an order data object via a first API for a first system. The operations of 1105 may be performed according to the methods described herein. In some examples, aspects of the operations of 1105 may be performed by a multi-system component as described with reference to FIGS. 6 through 8.

At 1110, the database server may generate the order data object including an order identifier based on the first information. The operations of 1110 may be performed according to the methods described herein. In some examples, aspects of the operations of 1110 may be performed by a data object reception component as described with reference to FIGS. 6 through 8.

At 1115, the database server may create an order summary data object based on the order data object. The operations of 1115 may be performed according to the methods described herein. In some examples, aspects of the operations of 1115 may be performed by an order summary creation component as described with reference to FIGS. 6 through 8.

At 1120, the database server may receive second information corresponding to an additional data object via a second API different from the first API for a second system different from the first system. The operations of 1120 may be performed according to the methods described herein. In some examples, aspects of the operations of 1120 may be performed by a multi-system component as described with reference to FIGS. 6 through 8.

At 1125, the database server may generate the additional data object associated with the order identifier based on the second information. The operations of 1125 may be performed according to the methods described herein. In some examples, aspects of the operations of 1125 may be performed by a data object reception component as described with reference to FIGS. 6 through 8.

At 1130, the database server may update the order summary data object based on the additional data object. The operations of 1130 may be performed according to the methods described herein. In some examples, aspects of the operations of 1130 may be performed by an order summary updating component as described with reference to FIGS. 6 through 8.

A method for data object aggregation at a database system is described. The method may include receiving an order data object including an order identifier, creating an order summary data object based on receiving the order data object, receiving an additional data object associated with the order identifier, updating the order summary data object based on the additional data object, receiving a query for a value corresponding to a first field value at the order data object and a second field value at the additional data object, where the query includes the order identifier, and retrieving, in response to the query, the value directly from the updated order summary data object based on the updated order summary data object including information for both the order data object and the additional data object.

An apparatus for data object aggregation at a database system is described. The apparatus may include a processor, memory coupled with the processor, and instructions stored in the memory. The instructions may be executable by the processor to cause the apparatus to receive an order data object including an order identifier, create an order summary data object based on receiving the order data object, receive an additional data object associated with the order identifier, update the order summary data object based on the additional data object, receive a query for a value corresponding to a first field value at the order data object and a second field value at the additional data object, where the query includes the order identifier, and retrieve, in response to the query, the value directly from the updated order summary data object based on the updated order summary data object including information for both the order data object and the additional data object.

Another apparatus for data object aggregation at a database system is described. The apparatus may include means for receiving an order data object including an order identifier, creating an order summary data object based on receiving the order data object, receiving an additional data object associated with the order identifier, updating the order summary data object based on the additional data object, receiving a query for a value corresponding to a first field value at the order data object and a second field value at the additional data object, where the query includes the order identifier, and retrieving, in response to the query, the value directly from the updated order summary data object based on the updated order summary data object including information for both the order data object and the additional data object.

A non-transitory computer-readable medium storing code for data object aggregation at a database system is described. The code may include instructions executable by a processor to receive an order data object including an order identifier, create an order summary data object based on receiving the order data object, receive an additional data object associated with the order identifier, update the order summary data object based on the additional data object, receive a query for a value corresponding to a first field value at the order data object and a second field value at the additional data object, where the query includes the order identifier, and retrieve, in response to the query, the value directly from the updated order summary data object based on the updated order summary data object including information for both the order data object and the additional data object.

In some examples of the method, apparatuses, and non-transitory computer-readable medium described herein, the order summary data object may include a current state associated with the order identifier. Some examples of the method, apparatuses, and non-transitory computer-readable medium described herein may further include operations, features, means, or instructions for storing the order summary data object at the database system.

Some examples of the method, apparatuses, and non-transitory computer-readable medium described herein may further include operations, features, means, or instructions for storing the order data object and the additional data object at the database system, where the order summary data object includes a first indicator referencing the order data object and a second indicator referencing the additional data object.

Some examples of the method, apparatuses, and non-transitory computer-readable medium described herein may further include operations, features, means, or instructions for determining, upon receiving the order data object, that the database system does not currently store an existing order summary data object corresponding to the order identifier, where the order summary data object may be created based on the determining that the database system does not currently store the existing order summary data object.

Some examples of the method, apparatuses, and non-transitory computer-readable medium described herein may further include operations, features, means, or instructions for determining, upon receiving the additional data object, that the database system currently stores the order summary data object corresponding to the order identifier, where the order summary data object may be updated based on the determining that the database system currently stores the order summary data object.

Some examples of the method, apparatuses, and non-transitory computer-readable medium described herein may further include operations, features, means, or instructions for generating an initial value for an aggregate data field of the order summary data object based on the first field value for the order data object and calculating the value for the aggregate data field of the order summary data object based on the second field value for the additional data object, where the value may be retrieved directly from the updated order summary data object based on the calculating.

Some examples of the method, apparatuses, and non-transitory computer-readable medium described herein may further include operations, features, means, or instructions for receiving a tag for the value and tagging the aggregate data field with the tag based on the order summary data object including the value for the aggregate data field, where the order data object and the additional data object do not include the value for tagging.

Some examples of the method, apparatuses, and non-transitory computer-readable medium described herein may further include operations, features, means, or instructions for receiving first information corresponding to the order data object via a first API for a first system, where receiving the order data object includes generating the order data object based on the first information, and receiving second information corresponding to the additional data object via a second API different from the first API for a second system different from the first system, where receiving the additional data object includes generating the additional data object based on the second information.

In some examples of the method, apparatuses, and non-transitory computer-readable medium described herein, the first field value may be represented in the first information using a first data format, the second field value may be represented in the second information using a second data format different from the first data format, and the value may be represented in the updated order summary data object using the first data format, the second data format, or a third data format different from the first data format and the second data format based on converting the first data format to a first converted data format for the order data object, converting the second data format to a second converted data format for the additional data object, or both.

Some examples of the method, apparatuses, and non-transitory computer-readable medium described herein may further include operations, features, means, or instructions for transmitting, for display in a user interface, a set of data associated with the order summary data object, where the query may be received based on a user input to the user interface.

Some examples of the method, apparatuses, and non-transitory computer-readable medium described herein may further include operations, features, means, or instructions for transmitting, for display in the user interface, the retrieved value in response to the query, where the user interface may be updated within a real-time time constraint based on retrieving the value directly from the updated order summary data object.

In some examples of the method, apparatuses, and non-transitory computer-readable medium described herein, the user interface may be associated with a tenant of the database system, an end-user for the tenant, or both.

In some examples of the method, apparatuses, and non-transitory computer-readable medium described herein, the order summary data object inherits field-based security parameters from the order data object.

Some examples of the method, apparatuses, and non-transitory computer-readable medium described herein may further include operations, features, means, or instructions for receiving an additional query for an additional value corresponding to a third field value at the order data object, where the additional query includes the order identifier, determining that the order summary data object does not include the additional value, and retrieving, in response to the additional query, the additional value from the order data object based on the order summary data object not including the additional value.

Some examples of the method, apparatuses, and non-transitory computer-readable medium described herein may further include operations, features, means, or instructions for activating order summaries at the database system, identifying an additional order data object including an additional order identifier stored at the database system, searching the database system for one or more additional data objects associated with the additional order identifier, and building an additional order summary data object corresponding to the additional order identifier based on the additional order data object including the additional order identifier and the one or more additional data objects associated with the additional order identifier.

In some examples of the method, apparatuses, and non-transitory computer-readable medium described herein, the additional data object is an additional order data object, a change order data object, a fulfillment order data object, or a return order data object.

In some examples of the method, apparatuses, and non-transitory computer-readable medium described herein, the additional data object may be the additional order data object associated with the order identifier and the updating includes replacing current order information for the order summary data object including first order information associated with the order data object with second order information associated with the additional order data object, the additional data object may be the change order data object associated with the order identifier and the updating includes modifying the current order information for the order summary data object from the first order information associated with the order data object based on third order information associated with the change order data object, or the additional data object may be the fulfillment order data object associated with the order identifier or the return order data object associated with the order identifier and the updating includes modifying a current status for at least one item in the order summary data object based on the fulfillment order data object or the return order data object.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data object aggregation at a database system, comprising:
   receiving an order data object comprising an order identifier, the order data object having a first data object type;
   creating an order summary data object in response to receiving the order data object;
   receiving an additional data object associated with the order identifier, the additional data object having a second data object type different from the first data object type of the order data object;
   updating the order summary data object in response to receiving the additional data object that is associated with the order identifier;
   receiving a query for a value corresponding to a first field value at the order data object and a second field value at the additional data object, the first field value being for a first field type of the first data object type and the second field value being for a second field type of the second data object type, wherein the query comprises the order identifier; and
   retrieving, in response to the query, the value directly from the updated order summary data object based at least in part on the updated order summary data object comprising information for both the order data object and the additional data object, wherein the retrieving comprises refraining from accessing the order data object and the additional data object in response to the query.

2. The method of claim 1, wherein the order summary data object comprises a current state associated with the order identifier, the method further comprising:
   storing the order summary data object at the database system.

3. The method of claim 2, further comprising:
   storing the order data object and the additional data object at the database system, wherein the order summary data object comprises a first indicator referencing the order data object and a second indicator referencing the additional data object.

4. The method of claim 1, further comprising:
   determining, upon receiving the order data object, that the database system does not currently store an existing order summary data object corresponding to the order identifier, wherein the order summary data object is created based at least in part on the determining that the database system does not currently store the existing order summary data object.

5. The method of claim 4, further comprising:
   determining, upon receiving the additional data object, that the database system currently stores the order summary data object corresponding to the order identifier, wherein the order summary data object is updated based at least in part on the determining that the database system currently stores the order summary data object.

6. The method of claim 1, further comprising:
   generating an initial value for an aggregate data field of the order summary data object based at least in part on the first field value for the order data object; and
   calculating the value for the aggregate data field of the order summary data object based at least in part on the second field value for the additional data object, wherein the value is retrieved directly from the updated order summary data object based at least in part on the calculating.

7. The method of claim 6, further comprising:
   receiving a tag for the value; and
   tagging the aggregate data field with the tag based at least in part on the order summary data object comprising the value for the aggregate data field, wherein the order data object and the additional data object do not comprise the value for tagging.

8. The method of claim 1, further comprising:
   receiving first information corresponding to the order data object via a first application programming interface (API) for a first system, wherein receiving the order data object comprises generating the order data object based at least in part on the first information; and
   receiving second information corresponding to the additional data object via a second API different from the first API for a second system different from the first system, wherein receiving the additional data object comprises generating the additional data object based at least in part on the second information.

9. The method of claim 8, wherein:
   the first field value is represented in the first information using a first data format;
   the second field value is represented in the second information using a second data format different from the first data format; and
   the value is represented in the updated order summary data object using the first data format, the second data format, or a third data format different from the first data format and the second data format based at least in part on converting the first data format to a first converted data format for the order data object, converting the second data format to a second converted data format for the additional data object, or both.

10. The method of claim 1, further comprising:
    transmitting, for display in a user interface, a set of data associated with the order summary data object, wherein the query is received based at least in part on a user input to the user interface.

11. The method of claim 10, further comprising:
    transmitting, for display in the user interface, the retrieved value in response to the query, wherein the user interface is updated within a real-time time constraint based at least in part on retrieving the value directly from the updated order summary data object.

12. The method of claim 10, wherein the user interface is associated with a tenant of the database system, an end-user for the tenant, or both.

13. The method of claim 1, wherein the order summary data object inherits field-based security parameters from the order data object.

14. The method of claim 1, further comprising:
    receiving an additional query for an additional value corresponding to a third field value at the order data object, wherein the additional query comprises the order identifier;
    determining that the order summary data object does not comprise the additional value; and
    retrieving, in response to the additional query, the additional value from the order data object based at least in part on the order summary data object not comprising the additional value.

15. The method of claim 1, further comprising:
    activating order summaries at the database system;
    identifying an additional order data object comprising an additional order identifier stored at the database system;

searching the database system for one or more additional data objects associated with the additional order identifier; and building an additional order summary data object corresponding to the additional order identifier based at least in part on the additional order data object comprising the additional order identifier and the one or more additional data objects associated with the additional order identifier.

16. The method of claim 1, wherein the additional data object comprises an additional order data object, a change order data object, a fulfillment order data object, or a return order data object.

17. The method of claim 16, wherein:

the additional data object comprises the additional order data object associated with the order identifier and the updating comprises replacing current order information for the order summary data object comprising first order information associated with the order data object with second order information associated with the additional order data object;

the additional data object comprises the change order data object associated with the order identifier and the updating comprises modifying the current order information for the order summary data object from the first order information associated with the order data object based at least in part on third order information associated with the change order data object; or the additional data object comprises the fulfillment order data object associated with the order identifier or the return order data object associated with the order identifier and the updating comprises modifying a current status for at least one item in the order summary data object based at least in part on the fulfillment order data object or the return order data object.

18. An apparatus for data object aggregation at a database system, comprising:

a processor;

memory coupled with the processor; and instructions stored in the memory and executable by the processor to cause the apparatus to:

receive an order data object comprising an order identifier, the order data object having a first data object type;

create an order summary data object in response to receiving the order data object;

receive an additional data object associated with the order identifier, the additional data object having a second data object type different from the first data object type of the order data object;

update the order summary data object in response to receiving the additional data object that is associated with the order identifier;

receive a query for a value corresponding to a first field value at the order data object and a second field value at the additional data object, the first field value being for a first field type of the first data object type and the second field value being for a second field type of the second data object type, wherein the query comprises the order identifier; and retrieve, in response to the query, the value directly from the updated order summary data object based at least in part on the updated order summary data object comprising information for both the order data object and the additional data object, wherein the retrieving comprises refraining from accessing the order data object and the additional data object in response to the query.

19. The apparatus of claim 18, wherein the order summary data object comprises a current state associated with the order identifier, and the instructions are further executable by the processor to cause the apparatus to:

store the order summary data object at the database system.

20. A non-transitory computer-readable medium storing code for data object aggregation at a database system, the code comprising instructions executable by a processor to:

receive an order data object comprising an order identifier, the order data object having a first data object type;

create an order summary data object in response to receiving the order data object;

receive an additional data object associated with the order identifier, the additional data object having a second data object type different from the first data object type of the order data object;

update the order summary data object in response to receiving the additional data object that is associated with the order identifier;

receive a query for a value corresponding to a first field value at the order data object and a second field value at the additional data object, the first field value being for a first field type of the first data object type and the second field value being for a second field type of the second data object type, wherein the query comprises the order identifier; and retrieve, in response to the query, the value directly from the updated order summary data object based at least in part on the updated order summary data object comprising information for both the order data object and the additional data object, wherein the retrieving comprises refraining from accessing the order data object and the additional data object in response to the query.

* * * * *